US012793988B2

(12) United States Patent
Kurihara

(10) Patent No.: US 12,793,988 B2
(45) Date of Patent: Nov. 10, 2026

(54) IONIC-LIQUID-IMPREGNATED CATALYST PARTICLES, MEMBRANE ELECTRODE ASSEMBLY FOR FUEL CELLS, AND FUEL CELL

(71) Applicant: TOPPAN INC., Tokyo (JP)

(72) Inventor: Hitoshi Kurihara, Tokyo (JP)

(73) Assignee: TOPPAN INC., Tokyo (JP)

( * ) Notice: Subject to any disclaimer, the term of this patent is extended or adjusted under 35 U.S.C. 154(b) by 484 days.

(21) Appl. No.: 18/397,884

(22) Filed: Dec. 27, 2023

(65) Prior Publication Data

US 2024/0128473 A1 Apr. 18, 2024

Related U.S. Application Data

(63) Continuation of application No. PCT/JP2022/026308, filed on Jun. 30, 2022.

(30) Foreign Application Priority Data

Jul. 1, 2021 (JP) ................................ 2021-110203

(51) Int. Cl.

| | |
|---|---|
| ***H01M 4/90*** | (2006.01) |
| ***H01M 4/86*** | (2006.01) |
| ***H01M 8/1004*** | (2016.01) |

(52) U.S. Cl.

CPC ....... *H01M 4/9075* (2013.01); *H01M 4/8605* (2013.01); *H01M 8/1004* (2013.01)

(58) Field of Classification Search

CPC ............. H01M 4/9075; H01M 4/8605; H01M 8/1004; H01M 2008/1095; H01M 4/86; H01M 4/8663; H01M 8/10; H01M 4/90; B01J 21/08; B01J 21/18; B01J 23/42; B01J 31/0224; B01J 31/0235; B01J 31/0271; B01J 31/0284; B01J 31/0298; B01J 37/0203; B01J 37/0207; B01J 37/0219; B01J 37/0221; B01J 37/0242; B01J 37/0248; Y02E 60/50

See application file for complete search history.

(56) References Cited

U.S. PATENT DOCUMENTS

2016/0211530 A1 7/2016 Kongkanand

FOREIGN PATENT DOCUMENTS

| | | | |
|---|---|---|---|
| JP | 2008-177134 | A | 7/2008 |
| JP | 2008-282635 | A | 11/2008 |
| JP | 2015-149247 | A | 8/2015 |
| WO | WO-2019/208310 | A1 | 10/2019 |

OTHER PUBLICATIONS

International Search Report and Written Opinion for International Application No. PCT/JP2022/026308, dated Sep. 6, 2022, 8 pgs. (with translation of search report).

European Extended Search Report issued in corresponding European Patent Application No. 22833294.6 dated Jul. 8, 2025.

(Continued)

*Primary Examiner* — Helen Oi K Conley
(74) *Attorney, Agent, or Firm* — Foley & Lardner LLP

(57) ABSTRACT

In catalyst particles including an electrically conductive carrier and metal particles supported by the electrically conductive carrier, the metal particles are embedded in a porous inorganic material. The catalyst particles containing the porous inorganic material are ionic-liquid-impregnated catalyst particles impregnated with an ionic liquid.

6 Claims, 1 Drawing Sheet

(56) References Cited

OTHER PUBLICATIONS

Tran et al., "Pt-based alloy/carbon black nanohybrid covered with ionic liquid supramolecules as an efficient catalyst for oxygen reduction reactions", Applied Catalysis B. Environmental, Elsevier, Amsterdam, NL, vol. 204, Nov. 24, 2016, pp. 365-373.

Wang et al., "Progress in modified carbon support materials for Pt and Pt-alloy cathode catalysts in polymer electrolyte membrane fuel cells", Progress in Materials Science, Pergamon Press, GB, vol. 82, Jun. 28, 2016, pp. 445-498.

Zhao et al., "Novel ionic liquid supported synthesis of platinum-based electrocatalysts on multiwalled carbon nanotubes", Electrochemistry Communications, Elsevier Amsterdam, NL, vol. 8, No. 2, Feb. 1, 2006, pp. 245-250.

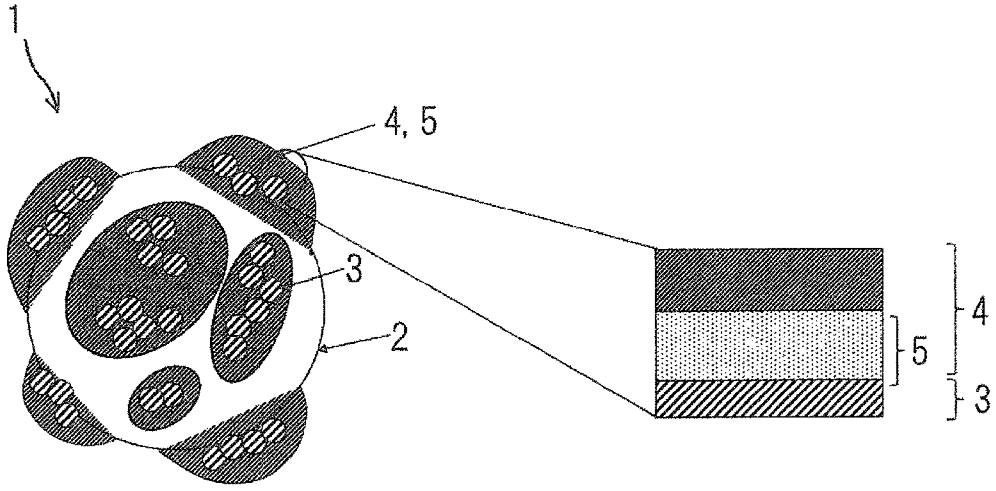
1
4, 5
3
2
4
5
3

IONIC-LIQUID-IMPREGNATED CATALYST PARTICLES, MEMBRANE ELECTRODE ASSEMBLY FOR FUEL CELLS, AND FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/026308, filed on Jun. 30, 2022, which is based upon and claims the benefit of priority to Japanese Patent Application No. 2021-110203, filed on Jul. 1, 2021, the disclosures of which are incorporated herein by reference in their entirety.

TECHNICAL FIELD

The present invention relates to ionic-liquid-impregnated catalyst particles, a membrane electrode assembly formed with the ionic-liquid-impregnated catalyst particles, and a fuel cell provided with the membrane electrode assembly.

BACKGROUND ART

There are known polymer electrolyte fuel cells that have a fuel cell provided with an electrolyte layer formed from ion exchange resin, a fuel-side electrode (anode) to which fuel is supplied, and an oxygen-side electrode (cathode) to which oxygen is supplied. In such a fuel cell, fuel is supplied to an anode while air is supplied to a cathode, which causes occurrence of an electromotive force and generates power. For example, a platinum-supporting carbon catalyst in which carbon supports platinum is proposed as the cathode catalyst. However, the platinum-supporting carbon catalyst has a problem in durability, and the supported platinum particles elute into the electrolyte layer, leading to a decrease in performance of the fuel cell.

Therefore, for example, PTL 1 described below proposes an electrode material in which an electrically conductive carrier and metal particles arranged on the electrically conductive carrier are embedded in a porous inorganic material to prevent the elution of the metal particles and suppress a decrease in performance of a fuel cell. Further, NPL 1 described below reports that oxygen reduction activity can be improved by applying an ionic liquid around Pt catalyst particles for suppressing a reaction between Pt catalyst particles and water.

CITATION LIST

Patent Literature

PTL 1: JP 2008-4541 A

Non-Patent Literature

NPL 1: ACS Catalysis, 2018, 8, 8244-8254

SUMMARY OF THE INVENTION

Technical Problem

However, the electrode material described in PTL 1 has the effect of suppressing the elution of metal particles but had a problem in that since the porous inorganic material covers the metal particles, a contact with an ionomer deteriorates, which increases resistance and causes a reduction in voltage. In the technology described in NPL 1, an ionic liquid is mainly held in pores of a carrier of Pt catalyst particles. Therefore, when the carrier is highly crystalline carbon, an ionic liquid is unlikely to be sufficiently held because of the low porosity of the carrier, and the coating effect produced by the ionic liquid was not sufficiently obtained. Further, in the case of highly loaded Pt catalyst particles that are mainly loaded on the surface of the carrier, the coating effect produced by the ionic liquid was not sufficiently obtained either.

The present invention focuses on the above-described points and has as its object to provide ionic-liquid-impregnated catalyst particles, a membrane electrode assembly for fuel cells, and a fuel cell, which are excellent in oxygen reduction activity and suppress the elution of metal particles from the catalyst particles.

Solution to Problem

The present inventor intensively conducted studies and found that, in a highly crystalline carbon carrier and catalyst particles in which metal particles are highly supported, embedding the metal particles in a porous inorganic material and impregnating the catalyst particles with an ionic liquid can improve oxygen reduction activity and suppress elution of metal particles, compared with catalyst particles containing a porous inorganic material and catalyst particles coated with an ionic liquid. Thus, the present invention has been accomplished.

Ionic-liquid-impregnated catalyst particles according to the present invention for solving the previously described problem are catalyst particles including an electrically conductive carrier and metal particles supported by the electrically conductive carrier, wherein the metal particles are embedded in a porous inorganic material, and the catalyst particles containing the porous inorganic material are impregnated with an ionic liquid.

The porous inorganic material preferably has a weight ratio (porous inorganic material)/(porous inorganic material+catalyst particles) of 0.01 or more and 0.2 or less.

An impregnation amount of the ionic liquid is preferably 50% by volume or more and 100% by volume or less of a mesopore volume of the catalyst particles containing the porous inorganic material.

The ionic liquid preferably contains a 1-alkyl-3-methylimidazolium bis(trifluoromethanesulfonyl)imide (where, alkyl is any one of methyl, ethyl, propyl, butyl, pentyl, hexyl, and heptyl).

A membrane electrode assembly for fuel cells according to the present invention for solving the previously described problem includes a catalyst layer formed with the above-described ionic-liquid-impregnated catalyst particles according to the present invention.

A fuel cell according to the present invention for solving the previously described problem includes the above-described ionic-liquid-impregnated catalyst particles according to the present invention. For example, the fuel cell may be provided with the above-described membrane electrode assembly provided with a catalyst layer formed with the ionic-liquid-impregnated catalyst particles according to the present invention.

Advantageous Effects of the Invention

According to the present invention, the porous inorganic material allows for suppression of the elution of the metal particles and stable retention of the ionic liquid on the surface of the metal particles. Therefore, there can be provided ionic-liquid-impregnated catalyst particles, a membrane electrode assembly for fuel cells, and a fuel cell having good oxygen reduction properties and excellent in durability.

BRIEF DESCRIPTION OF THE DRAWINGS

The FIGURE is a schematic illustrative view of a cross section of a main part of a preferred embodiment of an ionic-liquid-impregnated catalyst particle according to the present invention.

DETAILED DESCRIPTION

Hereinafter, embodiments of the present disclosure for ionic-liquid-impregnated catalyst particles, a membrane electrode assembly for fuel cells, and a fuel cell will be described with reference to the drawings as appropriate. However, the following embodiment is an example for describing the present disclosure and is not intended to limit the present disclosure to the following content. In the description, the same reference numerals are used for the same elements or elements having the same function, and repeated description is omitted in some cases. Moreover, the positional relationships, such as up and down, and left and right, are based on the positional relationships shown in the drawings unless otherwise specified. In addition, the dimensional ratios in the drawings are not limited to the ratios shown in the drawings. Technical matters described in the embodiments can be appropriately combined as necessary.

[Preferred Embodiment]

A preferred embodiment of ionic-liquid-impregnated catalyst particles, a membrane electrode assembly for fuel cells, and a fuel cell according to the present invention will be described below with reference to the FIGURE.

<Ionic-Liquid-Impregnated Catalyst Particles>

As illustrated in the FIGURE, ionic-liquid-impregnated catalyst particles according to the present embodiment contain a catalyst particle 1 having an electrically conductive carrier 2 and metal particles 3 supported by the electrically conductive carrier 2. The metal particles 3 are embedded in a porous inorganic material 4. A space between the porous inorganic material 4 and the metal particles 3 is impregnated with an ionic liquid 5. That is, the inside of the porous inorganic material 4, including its pores, are filled with the ionic liquid 5.

The metal particles 3 are mainly embedded in the porous inorganic material 4, and electronic conduction can be ensured. The inside of the pores of the porous inorganic material 4 is filled with the ionic liquid 5 and contact between water and the metal particles 3 can be suppressed. Filling the inside of the porous inorganic material 4 with the ionic liquid 5 allows for the stable retention of the ionic liquid 5 and suppresses the elution of the metal particles 3. Through the ionic liquid 5, protons can smoothly migrate to the metal particles 3, and resistance overvoltage can be suppressed.

The filling amount of the ionic liquid 5 (impregnation amount of the ionic liquid 5) has a volume equivalent of 50% by volume or more and 100% by volume or less of the mesopore volume of the catalyst particles 1. The mesopore volume can be calculated by, for example, a low-temperature nitrogen adsorption method. The used mesopore volume was the total pore volume of pores in the range of 1 nm to 100 nm. When the filling amount of the ionic liquid 5 is less than 50% by volume, sufficient effects cannot be obtained. When more than 100% by volume, the ionic liquid 5 flows out during power generation by a fuel cell having an electrode formed with the catalyst particles 1.

The metal particles 3 used in the catalyst particles 1 contain one or more of Pt, Rh, Pd, Au, and Ir. Examples thereof include Pt alone, alloy particles of Pt and Co, and core-shell particles in which a Pd core is coated with Pt particles. The porous inorganic material 4 contains one or more of silica ($SiO_2$), zirconia ($ZrO_2$), and titania ($TiO_2$). As the porous inorganic material 4, silica is preferably used.

The coating amount of the porous inorganic material 4 is such that the weight ratio (porous inorganic material)/(porous inorganic material+catalyst particles) is in a range of 0.01 or more and 0.2 or less, wherein the weight of the catalyst particles is the total weight of the metal particles and the electrically conductive carrier.

The coating amount of the porous inorganic material 4 can be calculated by, for example, X-ray photoelectron spectroscopy (XPS). When the coating amount of the porous inorganic material 4 is less than 1% by mass, it is difficult to sufficiently retain the ionic liquid 5 inside the porous inorganic material 4, and when more than 20% by mass, it is difficult to sufficiently ensure the electrical conductivity of the catalyst particles 1.

The ionic liquid 5 contains a 1-alkyl-3-methylimidazolium bis(trifluoromethanesulfonyl)imide, wherein the alkyl portion is any one of methyl, ethyl, propyl, butyl, pentyl, hexyl, and heptyl. The alkyl portion is particularly preferably a butyl group.

<Membrane Electrode Assembly for Fuel Cells>

A membrane electrode assembly for fuel cells according to the present embodiment includes a catalyst layer formed with the above-described ionic-liquid-impregnated catalyst particles according to the present embodiment. Such a membrane electrode assembly for fuel cells is provided with, for example, a polymer electrolyte membrane and a pair of electrode catalyst layers that are formed with the above-described ionic-liquid-impregnated catalyst particles according to the present embodiment and vertically sandwich the polymer electrolyte membrane. It should be noted that in the membrane electrode assembly for fuel cells, the ionic-liquid-impregnated catalyst particles on the anode side may be omitted, and the ionic-liquid-impregnated catalyst particles may be used only on the cathode side.

<Fuel Cell>

A fuel cell according to the present embodiment includes the above-described ionic-liquid-impregnated catalyst particles according to the present embodiment. Such a fuel cell is provided with, for example, a pair of gas diffusion layers. The gas diffusion layers face their corresponding electrode catalyst layers of the above-described membrane electrode assembly according to the present embodiment. The gas diffusion layers and their corresponding electrode catalyst layers form a cathode (positive electrode) and an anode (negative electrode).

<Effects of the Present Embodiment>

The invention according to the present embodiment exerts the following effects.

(1) In the ionic-liquid-impregnated catalyst particles according to the present embodiment, the catalyst particles 1 include the electrically conductive carrier 2 and the metal particles 3 supported by the electrically conductive carrier 2, wherein at least the metal particles 3 are embedded in the porous inorganic material 4, and the inside of the porous inorganic material 4 is filled with an ionic liquid 5.

With this configuration, the porous inorganic material 4 does not cover the entirety of the catalyst particle 1 and mainly embeds the metal particles 3 therein, and thus, electronic conduction can be ensured by the electrically conductive carrier 2. The insides of the pores of the porous inorganic material 4 are filled with the ionic liquid 5, and thus, contact between water and the metal particles 3 can be suppressed, and oxygen reduction properties can be improved. When the inside of the porous inorganic material 4 is filled with the ionic liquid 5, the ionic liquid 5 can be stably retained by electrostatic interaction even during operation of the fuel cell, and durability can be improved.

(2) The ionic-liquid-impregnated catalyst particles according to the present embodiment are constituted by the ionic liquid 5, the porous inorganic material 4, and the catalyst particles 1, wherein the content of the ionic liquid 5 is a volume equivalent of 50% by volume or more and 100% by volume or less of the mesopore volume of the catalyst particles 1 containing the porous inorganic material 4.

With this configuration, the ionic liquid 5 can be stably retained in the porous inorganic material 4, protons can smoothly migrate onto the metal particles 3 through the ionic liquid 5, and resistance overvoltage can be suppressed.

(3) The metal particles 3 of the catalyst particles 1 used in the ionic-liquid-impregnated catalyst particles according to the present embodiment contain one or more of Pt, Rh, Pd, Au, and Ir. Examples thereof include Pt alone, alloy particles of Pt and Co, and core-shell particles in which a Pd core is coated with Pt particles. The porous inorganic material 4 contains one or more of silica ($SiO_2$), zirconia ($ZrO_2$), and titania ($TiO_2$), and silica is preferably used.

With this configuration, the ionic-liquid-impregnated catalyst particles exhibit high oxygen reduction activity and particularly can be used as a cathode catalyst for fuel cells.

(4) In the porous inorganic material 4 of the ionic-liquid-impregnated catalyst particles according to the present embodiment, the weight ratio (porous inorganic material)/(porous inorganic material+catalyst particles) is 0.01 or more and 0.2 or less. The catalyst particle 1 is composed of the electrically conductive carrier 2 and the metal particles 3.

With this configuration, the ionic-liquid-impregnated catalyst particles can retain the ionic liquid 5 by the porous inorganic material 4 while suppressing the influence of the porous inorganic material 4 which is a resistance component.

(5) In the ionic-liquid-impregnated catalyst particles according to the present embodiment, the ionic liquid 5 has a chemical structure that contains a 1-alkyl-3-methylimidazolium bis(trifluoromethanesulfonyl) imide in which the alkyl portion is at least one of methyl, ethyl, propyl, butyl, pentyl, hexyl, and heptyl.

With such an ionic liquid 5, protons and oxygen can smoothly migrate to the metal particles 3 even when the metal particles 3 of the catalyst particles 1 are coated, and good oxygen reduction activity can be exhibited.

EXAMPLES

Examples of the ionic-liquid-impregnated catalyst particles, the membrane electrode assembly for fuel cells, and the fuel cell according to the present invention will be specifically described. It should be noted that the present invention is not limited to only examples specifically described below, and technical matters of the examples can be appropriately combined as necessary.

<Synthesis of Pt-Supporting Carbon>

Pt-supporting carbon is synthesized according to a known method, and the amount of Pt supported was given by the ratio Pt/C=70/30 (mass ratio). The carbon carrier used had a G band/D band ratio of 1.3 or more by Raman spectroscopy.

<Synthesis of Silica-Coated Pt-Supporting Carbon>

The Pt-supporting carbon was added to and dispersed in a tetradecyltrimethylammonium bromide (TTAB) aqueous solution. Subsequently, a mixed solution of tetraethoxysilane (TEOS) and ethanol was added. Sodium hydroxide was added and the mixture was stirred for 2 hours. Thereafter, the treated Pt-supporting carbon was separated using a centrifugal separator and dried at 80° C. for 6 hours. Finally, the adhered TTAB was removed through heat treatment at 350° C. under an air atmosphere to obtain silica-coated Pt-supporting carbon. The silica coating amount in the synthesized silica-coated Pt-supporting carbon was adjusted by the amount of TEOS used. The silica coating amount was calculated by XPS.

<Synthesis of Ionic-Liquid-Impregnated Silica-Coated Pt-Supporting Carbon>

The synthesized silica-coated Pt-supporting carbon was added to acetonitrile, and an ionic liquid was added depending on the mesopore volume of the silica-coated Pt-supporting carbon. Ultrasonic dispersion was performed for 30 minutes, and thereafter the acetonitrile was removed using an evaporator to obtain ionic-liquid-impregnated silica-coated Pt-supporting carbon. The added amount of the ionic liquid was calculated based on the mesopore volume in the range of 1 nm to 100 nm by a low-temperature nitrogen adsorption method.

Example 1

According to the previously described process, silica-coated Pt-supporting carbon having a silica coating amount of 10% by mass was synthesized with Pt-supporting carbon (Pt/C=70/30 (mass ratio)), and 1-butyl-3-methylimidazolium bis(trifluoromethanesulfonyl)imide having a volume that is 80% by volume of the mesopore volume was used to obtain catalyst particles (ionic-liquid-impregnated silica-coated Pt-supporting carbon) of Example 1.

Example 2

According to the previously described process, silica-coated Pt-supporting carbon having a silica coating amount of 1% by mass was synthesized with Pt-supporting carbon (Pt/C=70/30 (mass ratio)), and 1-butyl-3-methylimidazolium bis(trifluoromethanesulfonyl)imide having a volume that is 80% by volume of the mesopore volume was used to obtain catalyst particles (ionic-liquid-impregnated silica-coated Pt-supporting carbon) of Example 2.

Example 3

According to the previously described process, silica-coated Pt-supporting carbon having a silica coating amount of 20% by mass was synthesized with Pt-supporting carbon (Pt/C=70/30 (mass ratio)), and 1-butyl-3-methylimidazolium bis(trifluoromethanesulfonyl)imide having a volume that is 80% by volume of the mesopore volume was used to obtain catalyst particles (ionic-liquid-impregnated silica-coated Pt-supporting carbon) of Example 3.

Example 4

According to the previously described process, silica-coated Pt-supporting carbon having a silica coating amount of 10% by mass was synthesized with Pt-supporting carbon (Pt/C=70/30 (mass ratio)), and 1-butyl-3-methylimidazolium bis(trifluoromethanesulfonyl)imide having a volume that is 50% by volume of the mesopore volume was used to obtain catalyst particles (ionic-liquid-impregnated silica-coated Pt-supporting carbon) of Example 4.

Example 5

According to the previously described process, silica-coated Pt-supporting carbon having a silica coating amount of 10% by mass was synthesized with Pt-supporting carbon (Pt/C=70/30 (mass ratio)), and 1-butyl-3-methylimidazolium bis(trifluoromethanesulfonyl)imide having a volume that is 100% by volume of the mesopore volume was used to obtain catalyst particles (ionic-liquid-impregnated silica-coated Pt-supporting carbon) of Example 5.

Example 6

According to the previously described process, silica-coated Pt-supporting carbon having a silica coating amount of 10% by mass was synthesized with Pt-supporting carbon (Pt/C=70/30 (mass ratio)), and 1-ethyl-3-methylimidazolium bis(trifluoromethanesulfonyl)imide having a volume that is 80% by volume of the mesopore volume was used to obtain catalyst particles (ionic-liquid-impregnated silica-coated Pt-supporting carbon) of Example 6.

Comparative Example 1

Pt-supporting carbon (Pt/C=70/30 (mass ratio)) was used as catalyst particles (Pt-supporting carbon) of Comparative Example 1.

Comparative Example 2

According to the previously described process, silica-coated Pt-supporting carbon having a silica coating amount of 0.1% by mass was synthesized with Pt-supporting carbon (Pt/C=70/30 (mass ratio)), and 1-butyl-3-methylimidazolium bis(trifluoromethanesulfonyl)imide having a volume that is 80% by volume of the mesopore volume was used to obtain catalyst particles (ionic-liquid-impregnated silica-coated Pt-supporting carbon) of Comparative Example 2.

Comparative Example 3

According to the previously described process, silica-coated Pt-supporting carbon having a silica coating amount of 30% by mass was synthesized with Pt-supporting carbon (Pt/C=70/30 (mass ratio)), and 1-butyl-3-methylimidazolium bis(trifluoromethanesulfonyl)imide having a volume that is 50% by volume of the mesopore volume was used to obtain catalyst particles (ionic-liquid-impregnated silica-coated Pt-supporting carbon) of Comparative Example 3.

Comparative Example 4

According to the previously described process, silica-coated Pt-supporting carbon having a silica coating amount of 10% by mass was synthesized with Pt-supporting carbon (Pt/C=70/30 (mass ratio)), and 1-butyl-3-methylimidazolium bis(trifluoromethanesulfonyl)imide having a volume that is 40% by volume of the mesopore volume was used to obtain catalyst particles (ionic-liquid-impregnated silica-coated Pt-supporting carbon) of Comparative Example 4.

Comparative Example 5

According to the previously described process, silica-coated Pt-supporting carbon having a silica coating amount of 10% by mass was synthesized with Pt-supporting carbon (Pt/C=70/30 (mass ratio)), and 1-butyl-3-methylimidazolium bis(trifluoromethanesulfonyl)imide having a volume that is 110% by volume of the mesopore volume was used to obtain catalyst particles (ionic-liquid-impregnated silica-coated Pt-supporting carbon) of Comparative Example 5.

Comparative Example 6

According to the previously described process, silica-coated Pt-supporting carbon having a silica coating amount of 10% by mass was synthesized with Pt-supporting carbon (Pt/C=70/30 (mass ratio)) to obtain catalyst particles (silica-coated Pt-supporting carbon) of Comparative Example 6.

Comparative Example 7

According to the previously described process, 1-butyl-3-methylimidazolium bis(trifluoromethanesulfonyl)imide having a volume that is 80% by volume of the mesopore volume was used with Pt-supporting carbon (Pt/C=70/30 (mass ratio)) to obtain catalyst particles (ionic-liquid-impregnated Pt-supporting carbon) of Comparative Example 7.

Comparative Example 8

According to the previously described process, silica-coated Pt-supporting carbon having a silica coating amount of 10% by mass was synthesized with Pt-supporting carbon (Pt/C=70/30 (mass ratio)), and 1-octyl-3-methylimidazolium bis(trifluoromethanesulfonyl)imide having a volume that is 80% by volume of the mesopore volume was used to obtain catalyst particles (ionic-liquid-impregnated silica-coated Pt-supporting carbon) of Comparative Example 8.

<Preparation of Catalyst Ink>

A mixed solution of water, normal propyl alcohol (NPA), and ethanol (7:2:1), the catalyst particles of each of Examples 1 to 6 and Comparative Examples 1 to 8, and a dispersion liquid of perfluorocarbon ("Nafion (registered trademark)" manufactured by Sigma-Aldrich, Inc. (United States)) were mixed and dispersed using a ball mill to prepare a catalyst ink of each of Examples 1 to 6 and Comparative Examples 1 to 8. The I (ionomer)/C (carrier carbon) ratio was 0.8, and the solid content was 14.5% by mass.

<Preparation of Membrane Electrode Assembly>

The catalyst ink formed with the catalyst particles according to each of Examples 1 to 6 and Comparative Examples 1 to 8 was applied on a membrane of perfluorocarbon ("Nafion (registered trademark)" manufactured by Sigma-Aldrich, Inc. (United States)) such that the Pt basis weight was 0.44 mg/cm$^2$. Subsequently, drying at 80° C. for 5 minutes was performed to obtain a cathode-side catalyst layer. Pt-supporting carbon (Pt/C=30/70 (mass ratio)) was used to prepare a catalyst ink in the same manner as described above, and this catalyst ink was applied on the perfluorocarbon membrane opposite the cathode-side catalyst layer such that the Pt basis weight was 0.1 mg/cm$^2$. Subsequently, drying at 80° C. for 5 minutes was performed to obtain an anode-side catalyst layer. Thus, a membrane electrode assembly of each of Examples 1 to 6 and Comparative Examples 1 to 8 was prepared.

<I-V Measurement Method>

A gas diffusion layer and a gas seal were laminated to each side of the obtained membrane electrode assembly. The product was set in a standard Japan Automobile Research Institute (JARI) cell (electrode area 5×5 cm$^2$), and I-V measurement was performed in accordance with the cell evaluation analysis protocol of the New Energy and Industrial Technology Development Organization (NEDO). The current density was shifted from low current density to high current density while maintaining the measurement current density for 5 minutes. The measurement current densities were 0, 0.025, 0.050, 0.075, 0.1, 0.2, 0.4, 0.6, 0.8, 1.0, 1.2, 1.4, 1.5, and 1.6 A/cm$^2$.

<Durability Test Method>

The durability test was also performed in accordance with the NEDO cell evaluation analysis protocol. In a potential cycle test of load response simulation, 30,000 cycles were performed.

<Evaluation Results>

Table 1 shows the evaluation results for the fuel cells including the catalysts of Examples 1 to 6 and Comparative Examples 1 to 8 when I-V measurement was performed before and after the durability test. Specifically, with Comparative Example 1 (Pt-supporting carbon) as a reference, "Poor" is assigned when the voltage difference at 1.5 A/cm$^2$ during I-V measurement is less than 0 mV, "Good" when 0 to 10 mV, and "Excellent" when more than 10 mV.

TABLE 1

| | Silica coating amount (wt %) | Impregnation amount of ionic liquid (vol %) | Voltage before durability test (V@1.5 A/cm$^2$) | Voltage after durability test (V@1.5 A/cm$^2$) |
|---|---|---|---|---|
| Example 1 | 10 | 80 | Excellent | Excellent |
| Example 2 | 1 | 80 | Good | Excellent |
| Example 3 | 20 | 80 | Good | Excellent |
| Example 4 | 10 | 50 | Excellent | Excellent |
| Example 5 | 10 | 100 | Excellent | Good |
| Example 6 | 10 | 80 | Excellent | Excellent |
| Comparative Example 1 | 0 | 0 | — | — |
| Comparative Example 2 | 0.1 | 80 | Poor | Good |
| Comparative Example 3 | 30 | 80 | Poor | Excellent |
| Comparative Example 4 | 10 | 40 | Poor | Good |
| Comparative Example 5 | 10 | 110 | Poor | Good |
| Comparative Example 6 | 10 | 0 | Poor | Excellent |
| Comparative Example 7 | 0 | 80 | Good | Good |
| Comparative Example 8 | 10 | 80 | Poor | Poor |

As shown in Table 1, in Comparative Example 6 using Pt-supporting carbon coated with only silica, the voltage after the durability test was higher than that in Comparative Example 1, and durability was high. In Comparative Example 7 using a catalyst filled with only an ionic liquid, the voltage was higher than that in Comparative Example 1 both before and after the durability test, but the difference was small.

Examples 1, 2, and 3 and Comparative Examples 2 and 3 are evaluations of ionic-liquid-impregnated silica-coated Pt-supporting carbon adjusted to have different silica coating amounts, and the voltage after the durability test was higher than that in Comparative Example 1 when the silica coating amount was 1% by mass or more and 20% by mass or less.

Examples 1, 4, and 5 and Comparative Examples 4 and 5 are evaluations of ionic-liquid-impregnated silica-coated Pt-supporting carbon adjusted to have different ionic-liquid filling amounts, and the voltage before the durability test was higher than that in Comparative Example 1 when the ionic-liquid filling amount was 50% by mass or more and 100% by mass or less.

In Example 6, the ionic liquid was changed from 1-butyl-3-methylimidazolium bis(trifluoromethanesulfonyl)imide to 1-ethyl-3-methylimidazolium bis(trifluoromethanesulfonyl)imide. In Comparative Example 8, the ionic liquid was changed from 1-butyl-3-methylimidazolium bis(trifluoromethanesulfonyl)imide to 1-octyl-3-methylimidazolium bis(trifluoromethanesulfonyl)imide. With a shorter carbon chain in the alkyl portion of 1-alkyl-3-methylimidazolium bis(trifluoromethanesulfonyl)imide, the voltages both before and after the durability test were higher than those in Comparative Example 1. On the other hand, with a longer carbon chain, the voltages both before and after the durability test were lower than those in Comparative Example 1.

These demonstrated that the voltages before and after the durability test can be significantly increased by filling the pores of silica with the ionic liquid. It is considered that this is due to the following reason. The ionic liquid has the effect of suppressing adsorbed species that inhibit oxygen reduction of the Pt surface but cannot sufficiently coat low-coordinated Pt sites. On the other hand, a silica coating can selectively coat and protect low-coordinated Pt sites but is hydrophilic and thus has less effect of suppressing water-derived adsorbed species that inhibit oxygen reduction than the ionic liquid does. Therefore, it is considered that combining a silica coating and the ionic liquid provided high oxygen reduction properties while also improving the electrochemical stability of Pt.

INDUSTRIAL APPLICABILITY

The ionic-liquid-impregnated catalyst particles, the membrane electrode assembly for fuel cells, and the fuel cell according to the present invention have good oxygen reduction properties and are excellent in durability and thus can be significantly effectively utilized industrially.

REFERENCE SIGNS LIST

1 Catalyst particle; 2 Electrically conductive carrier; 3 Metal particles; 4 Porous inorganic material; 5 Ionic liquid.

What is claimed is:

1. Ionic-liquid-impregnated catalyst particles, comprising:

an electrically conductive carrier; and metal particles supported by the electrically conductive carrier, wherein the metal particles are embedded in a porous inorganic material, and the catalyst particles containing the porous inorganic material are impregnated with an ionic liquid.

2. The ionic-liquid-impregnated catalyst particles of claim 1, wherein the porous inorganic material has a weight ratio (porous inorganic material)/(porous inorganic material+catalyst particles) of 0.01 or more and 0.2 or less.

3. The ionic-liquid-impregnated catalyst particles of claim 1, wherein an impregnation amount of the ionic liquid is 50% by volume or more and 100% by volume or less of a mesopore volume of the catalyst particles containing the porous inorganic material.

4. The ionic-liquid-impregnated catalyst particles of claim 1, wherein the ionic liquid contains a 1-alkyl-3-methylimidazolium bis(trifluoromethanesulfonyl)imide (where, alkyl is any one of methyl, ethyl, propyl, butyl, pentyl, hexyl, and heptyl).

5. A membrane electrode assembly for fuel cells, the membrane electrode assembly comprising a catalyst layer formed with the ionic-liquid-impregnated catalyst particles of claim 1.

6. A fuel cell comprising the ionic-liquid-impregnated catalyst particles of claim 1.

* * * * *